Nov. 10, 1959 J. HAANTJES ET AL 2,912,492

MULTIPLEX TRANSMISSION SYSTEM

Filed Feb. 1, 1954

INVENTORS
JOHAN HAANTJES
KEES TEER
FREDERIK WILLEM DE VRIJER

BY [signature]

AGENT

United States Patent Office 2,912,492

Patented Nov. 10, 1959

2,912,492

MULTIPLEX TRANSMISSION SYSTEM

Johan Haantjes, Kees Teer, and Frederik Willem de Vrijer, Eindhoven, Netherlands, assignors, by mesne assignments, to North American Philips Company, Inc., New York, N.Y., a corporation of Delaware Application February 1, 1954, Serial No. 407,492

Claims priority, application Netherlands February 9, 1953

11 Claims. (Cl. 178—6.8)

This invention relates to a multiplex transmission system for transmitting in one frequency range three signals each relating to a television image or a similar image scanned line-wise, in which system an auxiliary carrier wave is employed for transmitting two of such signals.

In such systems, which may be used for colour television, it is known to transmit a signal of large band width continuously, the two other signals of smaller band width being alternately modulated on the auxiliary carrier wave so that they are transmitted alternately. The transmitter comprises a switch mechanism connecting, during one time period, the pick-up camera for one signal of smaller band width to a modulator in which this signal is modulated on the auxiliary carrier wave and connecting the pick-up camera for the other signal of smaller band width to the modulator during the next time period. The receiver also comprises a switch mechanism by which the signals from a detector tuned to the auxiliary carrier wave are supplied during one time period to the reproducing device associated with one signal and during the next time period to the reproducing device associated with the other signal. The switch mechanisms of transmitter and receiver are required to switch in synchronism, which naturally necessitates synchronisation apparatus.

In a further system of this type, in which all of the three signals are transmitted continuously, both signals of smaller band width are modulated on a component of the auxiliary carrier wave, both components being displaced in phase by $\pi/2$ radians relatively to each other. In order to detect the two signals, the auxiliary carrier with the two components displaced in phase by $\pi/2$ radians relatively to each other must again be produced by a local oscillator in the receiver, which consequently also requires synchronisation apparatus.

In the system according to the invention, the receiver dispenses with switch mechanisms or additional oscillators as well as with the synchronisation apparatus required therefor and has the feature that the auxiliary carrier wave is amplitude-modulated by one of the two signals of smaller band-width and frequency modulated by the other of said two signals. The term "frequency-modulation" is here to be understood to include so-called phase-modulation.

The invention comprises, essentially, a multiplex transmission system including a transmitter having an oscillator which produces a carrier wave, a first source of signals of relatively large band-width, a modulator for modulating the carrier wave with these signals, an oscillator which produces an auxiliary carrier wave, second and third sources of signals having relatively small band-widths, and modulator means for effecting simultaneous amplitude-modulation of the auxiliary carrier wave with signals from the second signal source and frequency-modulation of the auxiliary carrier wave with signals from the third signal source, and including a receiver having a demodulator for the modulated carrier wave, and amplitude and frequency demodulators for demodulating the amplitude and frequency modulations, respectively, of the auxiliary carrier wave. The invention achieves substantial cancellation of visual interaction of the signals and carriers, by properly choosing the frequency of the auxiliary carrier wave, or by resetting the phase of the auxiliary carrier wave between successive scannings of each image line.

In order that the invention may be readily carried into effect it will now be described in detail with reference to the accompanying drawing, given by way of example, and in which.

Figure 1:
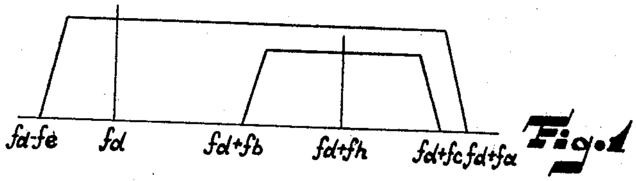
Fig. 1 shows a frequency spectrum for use in the transmission path of a system according to the invention.
Figure 2:
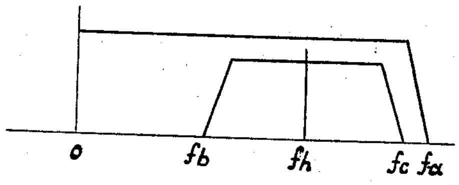
Fig. 2 shows a frequency spectrum for use in a transmitter.

Fig. 1 shows the frequency spectrum for use in the system according to the invention, for example if the three signals are transmitted by wireless, and which extends from a frequency $f_d-f_e$ to a frequency $f_d+f_a$. Such a frequency spectrum is obtained by modulation of a carrier wave of a frequency $f_d$ with two signals extending over frequency bands of from O to $f_a$ and from $f_b$ to $f_c$, as shown in Fig. 2, and partial suppression of the lower side band. Hence, the signal of large band width extends to the frequency $f_a$. The second signal between the frequencies $f_b$ and $f_c$ is produced by amplitude-modulation of an auxiliary carrier-wave of a frequency $f_h$ with one of the signals of small bandwidth and frequency-modulation with the other signal of small band-width. As has been stated above, the term frequency-modulation is here to be understood to include so-called phase-modulation.

Such a frequency spectrum is naturally also obtained by modulating the signal of large bandwidth on a carrier-wave of a frequency $f_d$ and by amplitude-modulation of a carrier-wave of a frequency $f_d+f_h$ with one of the signals of small band-width and frequency-modulation with the other signal of small band-width. After demodulation in the receiver, however, the carrier wave $f_d+f_h$ remains as an auxiliary carrier-wave of a frequency $f_h$ in the video-frequency spectrum of the signal of large band-width.

Figures 3, 4:
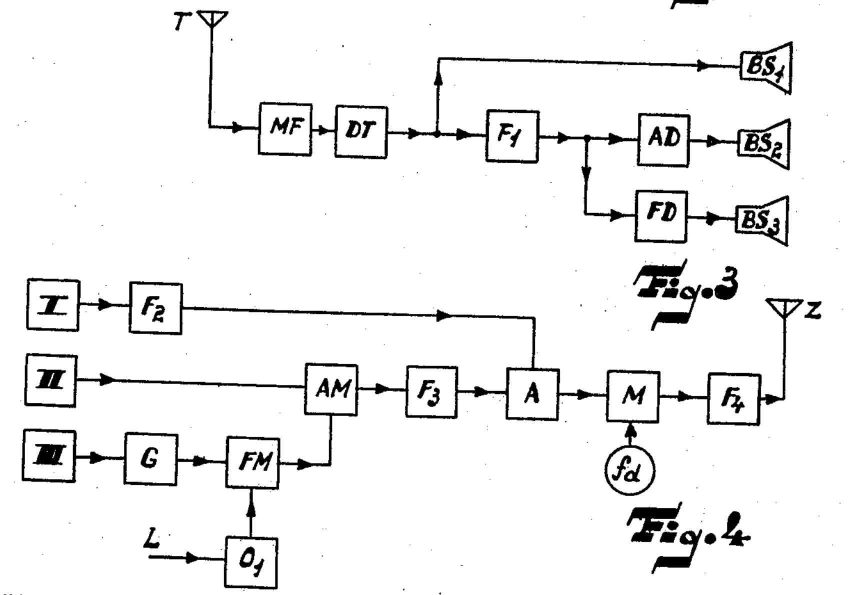
Fig. 3 shows diagrammatically an example of a receiver for a system according to the invention.
Fig. 4 shows diagrammatically an example of a transmitter for a system according to the invention.

Fig. 3 shows in block-schematic form a simplified example of a receiver suitable for receiving the aforesaid signals. The signal picked up by a receiving antenna T is supplied via a possible intermediate frequency stage MF to a detection stage DT at the output of which there is a signal as shown in Fig. 2. This output signal is supplied on the one hand to a picture tube $BS_1$ and on the other hand to a band-pass filter $F_1$ with a pass-band between the frequencies $f_b$ and $f_c$. The output signal of $F_1$ is on the one hand amplitude-detected by means of an amplitude detector AD, on the other hand it is amplitude-limited and frequency-demodulated, for example by means of a stage FD. The output signal of the amplitude detector is supplied to a picture tube $BS_2$. The output signal of the stage FD which, in the case of using phase-modulation, moreover comprises an integrating network, is supplied to a picture tube $BS_3$. If need be, combinations of the output signals of DT, AD and FD may naturally be supplied to the three picture tubes. Finally, the images of the three picture tubes $BS_1$, $BS_2$ and $BS_3$ may be united by optical means. Alternatively, for example, the output signals of DT, AD and FD may be supplied to the control electrodes of a three-colour tube.

Hereinafter, in contradistinction to the foregoing, frequency-modulation is to be understood to mean the case in which the modulated auxiliary carrier-wave is of the form of $$\cos\left(\omega_h t+\int_0^t s(u)du\right)$$

in which $u$ is an arbitrary symbol for time and in phase modulation the modulated auxiliary carrier wave has the form $$\cos(\omega_h t+s(t))$$

where $s(t)$ represents the signal of small band width and $$f_h=\frac{\omega_h}{2\pi}$$

the frequency of the auxiliary carrier-wave.

When considering the image of the picture tube $BS_1$ or the image on the screen of the tricolour tube from the output signal of DT this image from the signal of large band width will be disturbed (as is known) by the modulated auxiliary carrier-wave in the frequency range of said signal. Conversely, the images from the signals of smaller bandwidth will be troubled by the signal of large bandwidth. Again it is known that, if the auxiliary carrier-wave is amplitude-modulated with only one signal, the relative visual disturbances may substantially be effaced to the eye by appropriate means. If, for example, the image consists of an odd number of lines as usual and the frequency of the auxiliary carrier-wave is made equal to an odd multiple of half the line frequency, a disturbance on a given line upon the next scanning of this line is found to be largely suppressed, since the auxiliary carrier-wave has been displaced in phase by $\pi$ radians relatively to the first scanning. Strictly speaking, this holds as a rule only if a stationary object is viewed by the pick-up cameras. However, if the image frequency is not too small this will, to a close approximation, also be true for moving objects.

In the present case, however, where the auxiliary carrier-wave is moreover frequency- or phase-modulated, this is insufficient if the frequency of the auxiliary carrier-wave is indeed chosen to be an odd multiple of half the line frequency, since an auxiliary carrier-wave of a frequency $f_h$, which is frequency-modulated with a signal $s(t)$, has a form $$\cos\left(\omega_h t+\int_0^t s(u)du\right)$$

The requirement for visual compensation of the interference caused by said modulated auxiliary carrier-wave on a given line in the image of the signal of large band width is that after one image period, that is to say on the scanning of the same line following next in time, this form on said line should differ by an odd number times $\pi$ radians in phase from the form holding for the preceding scanning of said line. Assuming the image period to be T and the number of lines, of which an image is made up, to be $2n+1$, where $n$ is a whole positive number, then, at least for a stationary image, we should have $$\Delta\varphi=\omega_h(T+t)+\int_0^{T+t}s(u)du-\omega_h t-\int_0^t s(u)du=\pm(2k+1)\pi$$

where $k$ is a whole positive number and $\Delta\varphi$ is the difference in phase of the modulated carrier wave for two successive scannings of a line.

$\omega_h$ is so chosen that $$\omega_h=\frac{2m+1}{2}\cdot\frac{2\pi}{T_1}$$

where $m$ is a whole positive number and $T_1$ represents the line period. $s(t)$ may be represented by $$a+\sum_1^S b_p\cos(\omega_p t+\alpha_p)$$

where since $s(t)$ is obtained from a supposed stationary image, $\omega_p$ may be assumed to be equal to $$\frac{2\pi}{T}p$$

where $p$ is a whole positive number. Thus, by introducing $s(t)$ into the integrals and eliminating $\omega_h$ and considering that $T=(2n+1)T_1$ we have $$\Delta\varphi=(2n+1)(2m+1)\pi+aT.$$

Now, $(2n+1)(2m+1)$ is an odd number, that is to say that if $a=0$, in other words if $s(t)$ should not contain a direct current component, then $\Delta\varphi$ would be equal to $(2k+1)\pi$, so that compensation would actually occur.

It is to be noted that the said choice of the auxiliary carrier-wave frequency, which holds if the image is made up of an odd number of lines, constitutes a particular case, and if the choice of this frequency is equal to an odd multiple of half the image frequency, it holds for an image made up of an arbitrary number of lines.

Therefore, in the system according to the invention, if the frequency of the auxiliary carrier-wave is chosen to be an odd multiple of half the image frequency and this auxiliary carrier-wave is frequency-modulated by one of the signals of smaller bandwidth, the direct current component is removed from the video-frequency signal concerned at the transmitter and is reintroduced, by means of reference levels, into the video-frequency signal obtained after detection at the receiver end.

Naturally, removal of the D.C. component from the video-frequency signal which is required to frequency-modulate the auxiliary carrier-wave at the transmitter end does not entail difficulties. This necessitates only a non-direct coupling, such as a condenser, in the path between the pick-up camera concerned and the frequency modulator in which the signal is modulated on the auxiliary carrier-wave. However, the signal is required to contain reference levels in order to permit the D.C. component to be reintroduced at the receiver end. Said reference levels may be given in the form of pulses which occur during the blanking periods in the signal of large bandwidth. Reintroduction of the D.C. component by means of the reference levels at the receiver end may be effected in the same manner as is customary in black-and-white television receivers if here the D.C. component is lost in the path between the video detector and the picture tube, for example in capacitatively coupled two-stage amplifiers. This point will be explained more explicitly after the following discussion of Fig. 4.

Fig. 4 shows in block schematic form a simplified example of a transmitter for a multiplex transmission system according to the invention in the case of the auxiliary carrier-wave being an odd multiple of half the line frequency and frequency modulation being employed. The devices I, II and III each comprise a pick-up camera producing the signal of large bandwidth and the two signals of smaller bandwidth respectively. The signal from I is supplied to a low-pass filter $F_2$ having a cut-off frequency $f_a$. The signal from III is fed to a device G, wherein the D.C. component is eliminated from the signal. The output signal of G is supplied to a frequency modulator FM, wherein the output signal of G is modulated on an auxiliary carrier-wave whose frequency is an odd multiple of half the line frequency. This auxiliary carrier-wave is taken from a device $O_1$ comprising an appropriate oscillator which is controlled by means of the line synchronisation pulses incoming at L. The output signal of FM is supplied to an amplitude modulator AM, wherein the frequency-modulated auxiliary carrier-wave is amplitude-modulated by the output signal of II. The output signal of AM is supplied to a band-pass filter $F_3$ having a pass-band between the frequencies $f_b$ and $f_c$. The output signals of the filters $F_2$ and $F_3$ are combined in the addition device A. To the addition device A are also supplied the output signals of a gating device GC. This device may be of normal structure. The signal to be gated by it is the output signal of a low pass filter LP, to which is applied the output signal of the device III so that the output signal of LP comprises the D.C. component of the signal from III. The gating device is controlled by pulses L′, the repetition frequency of which is equal to that of the line synchronizing pulses, but which pulses are delayed with respect to the latter pulses such that they coincide with the back porches of the line synchronizing pulses. The pulses L′ may be derived from the line synchronizing pulses in any known manner. Returning to Fig. 3, it will now be clear how to reintroduce the D.C.-component in the signal to be fed to $BS_3$. The output signal of video detector DT is fed to a gating circuit GCR, which is controlled by pulses L″, the repetition rate of which is again that of the line synchronizing pulses, but which are delayed, with respect to the latter pulses such that they coincide again with the back porches of the line synchronizing pulses. The pulses L″ may be derived from the line synchronizing pulses by delaying the line synchronizing pulses. The output line of GCR is fed to a pulse detector PD of the kind used in A.G.C. circuits. The detector PD develops a voltage the amplitude of which varies directly with the level of the selected reference pulses, so this voltage represents the D.C.-component of the original output signal of III of Fig. 4. The output signal of PD is added to the output signal of FD by means of an adding circuit AR, the output of which thus contains the higher frequency component of the output signal of III as well as the D.C.-component of this signal. Returning now to Fig. 4, the output signal of A may be transmitted via a line or, after modulation on a high frequency carrier-wave of a frequency $f_d$ in the modulator M and bandwidth limitation in a band-pass filter $F_4$, be supplied to a transmitter antenna Z, as shown in Fig. 4. It is pointed out that the auxiliary carrier wave may alternatively first be amplitude-modulated by the output signal of II and then be frequency-modulated by the output signal of G. As a further alternative, the auxiliary carrier-wave may simultaneously be modulated both in amplitude and in frequency.

If, however, the auxiliary carrier-wave is phase-modulated with a signal $s(t)$, the modulated carrier-wave has a form $\cos(\omega_h t+s(t))$ In this case, also, $\Delta\varphi$ that is to say the difference in phase of this form with two scannings of one and the same line succeeding each other in time, is required to be an odd multiple of $\pi$ radians. With the said choice of the frequency of the auxiliary carrier-wave this is found to be perfectly true, since $$\Delta\varphi=\omega_h(T+t)+s(T+t)-\omega_h t-s(t)$$

Considering that $$\omega_h=\frac{2m+1}{2}\,\frac{2\pi}{T_1}$$

where $T_1$ again denotes the line period and $$T=(2n+1)T_1$$

and that in connection with the fact that the image contents may be deemed to be constant, at least during the said two image periods, hence $s(T+t)=s(t)$, we find $\Delta\varphi=(2n+1)(2m+1)\pi$, which is indeed an odd number times of $\pi$ radians.

In phase-modulation we find as a result of direct detection in the receiver $$\frac{ds(t)}{dt}$$

which is changed to $s(t)$ by an integrating network but in which the D.C. component fails. Also in this case, similarly as in the case of frequency-modulation, the D.C. component must consequently be re-introduced, for example by means of the reference levels associated with the signal considered, which component may again be given in the form of pulses which occur during the line synchronisation pulses or during the blanking period in the signal of large bandwidth. In this case, the transmitter is similar to the transmitter shown in Fig. 4 except, of course, that the device G, which serves to remove the D.C. component from the output signal of the device III, may be dispensed with and that the frequency modulator FM is required to be replaced by a phase-modulator.

An alternative method of at least substantially effacing to the eye the interference caused by the modulated auxiliary carrier-wave in the image of the signal of large bandwidth and, conversely, the interference caused by the signal of large bandwidth in the images of the signals of smaller bandwidth, consists in resetting the oscillator, which produces the auxiliary carrier-wave, each time at the beginning of each line in regard to the phase of the auxiliary carrier-wave in such a manner that on re-scanning a line after one image period the phase of the auxiliary carrier-wave has been displaced by $\pi$ radians relative to the preceding scan. This may, for example, be achieved by causing the oscillator to start with one and the same phase during one image period at the beginning of each line, which phase has however been displaced by $\pi$ radians relatively to that with which the oscillator was started during the preceding image period. The starting is controllable by means of the line synchronisation pulses and the phase-displacement by means of the image synchronisation pulses at the beginning of each image period. If the number of lines, of which an image is made up, is an odd number, this can also be achieved inter alia by starting the oscillator at the beginning of each line with a phase difference of $\pi$ radians relative to the preceding line. It is now sufficient to control the oscillator by means of the line synchronisation pulses.

In this method, the frequency of the auxiliary carrier wave may be chosen arbitrarily, naturally between O and $f_a$ and, in general, as closely as possible adjacent to $f_a$.

When using phase-modulation, this has for the transmitter and receiver as described with reference to Figs. 3 and 4 where, as stated, the device G may be dispensed with in connection with phase-modulation and the frequency modulator FM is a phase-modulator and the frequency detector FD is a phase detector, no other consequences than that the device $O_1$ of the transmitter need not comprise an oscillator whose frequency is equal to an odd multiple of half the line frequency, but an oscillator whose frequency may be chosen at will within said limits and whose phase is controlled by means of the line synchronisation pulses and, as the case may be, the image synchronisation pulses.

When employing frequency-modulation, however, this method has not only the advantages over the preceding method of providing freedom in choosing the frequency of the auxiliary carrier-wave but also that the D.C. component at the transmitter end need not be removed prior to the modulation process and need not be introduced into the video-frequency signal concerned at the receiver end. This means that, apart from corresponding modifications in the device $O_1$ when using phase-modulation, the device G can also be dispensed with in the transmitter shown in Fig. 4 and that the receiver shown in Fig. 3 need not comprise means for re-introducing the D.C. component into the output signal of FD by means of reference levels.

A further method in which, in the case of using frequency modulation, the D.C. component of the signal of small bandwidth, by which the auxiliary carrier-wave is frequency-modulated, need not be removed at the transmitter end prior to the modulation process and need not be introduced into the video-frequency signal concerned at the receiver end, consists in that the momentary frequency of the auxiliary carrier-wave is limited to a number of values which either are all an odd multiple of half the image frequency, for example if the image is made up of an odd number of lines to a number of values which are all an odd multiple of half the line frequency, the oscillators producing these frequencies remaining operative continuously, or are all chosen arbitrarily, but in which the oscillators producing the oscillations of these frequencies are each time reset at the beginning of each line in regard to the phase of these oscillations and again in such a manner that, on re-scanning a line after one image period, the phase of each of these oscillations has been displaced by $\pi$ radians relative to the preceding scan. The use of a number of oscillators which are reset each time has advantages over the use of one single oscillator each time reset in connection with noise problems. For each of said frequencies of the auxiliary carrier-wave it then holds that the associated phase has been displaced by $\pi$ radians after one image period, consequently that the interference caused by said auxiliary carrier-wave in the image of the signal of large bandwidth and, conversely, the interference caused by the signal of large bandwidth in the images of the signals of small bandwidth are at least substantially effaced to the eye.

Figure 5:
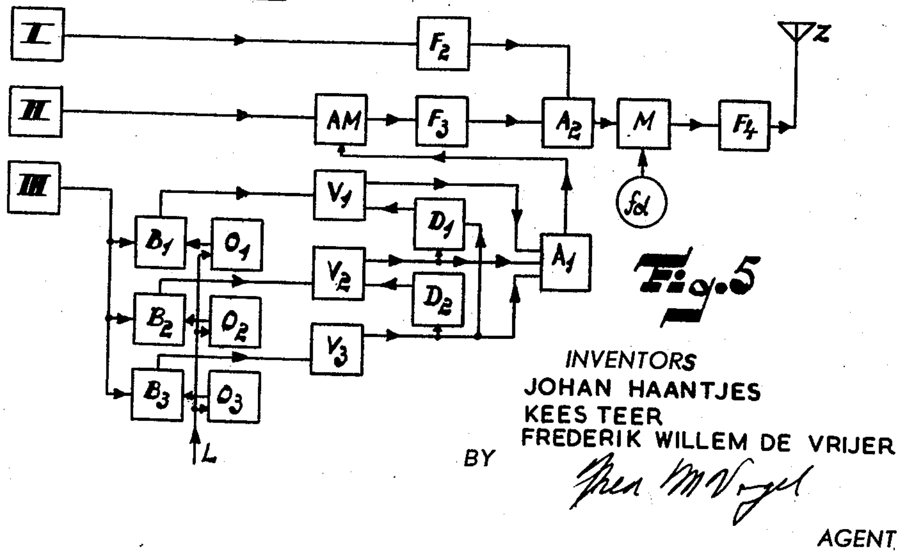
Fig. 5 shows diagrammatically an example of a transmitter for a system according to the invention operating differently from that shown in Fig. 4.

Fig. 5 shows in block schematic form a simplified example of a transmitter for use in this method. In this example, the number of momentary frequencies is limited to three. This will, in general, be too little, but the diagram may be extended with impunity and without changing the principle. The devices $O_1$, $O_2$ and $O_3$ each comprise an oscillator whose frequency is chosen to be an odd multiple of half the line frequency. To this end the devices are controlled by means of the line synchronisation pulses incoming at L.

The output signal of $O_1$ is supplied to the device $B_1$ and passed on by this device to a device $V_1$ only if the output voltage of the device III, which comprises a pick-up camera and produces one of the signals of smaller bandwidth, exceeds a given threshold value. For this purpose, the device $B_1$ may be a mixing tube with the output signal of III on one of the grids, the output signal of $O_1$ on another grid and the cathode bias voltage at a suitable positive value. $V_1$ is an amplifier having limiting properties so that the value of the output voltage is as little as possible dependent upon the value of the input voltage. The output signal of $V_1$ is passed to a mixing device $A_1$. The device $B_2$ corresponds to the device $B_1$ but the threshold value, above which the output signal of $O_2$ is passed to the device $V_2$, is higher than in $B_1$. If, consequently, the output voltage of the device III exceeds this threshold value, a signal having the frequency of the signal produced by the oscillator of the device $O_2$ appears at the output of $V_2$. The output signal of $V_2$ is also supplied to the mixing device $A_1$ and, moreover, to the detector $D_1$ which then produces a direct voltage to prevent the amplifier $V_1$ from producing an output voltage. The device $B_3$ has a slightly higher threshold value. If the output signal of III exceeds this value the device $O_3$ supplies via $B_3$ and $V_3$ a signal to $A_1$ and, moreover, signals to the detectors $D_1$ and $D_2$, whose output voltages prevent the amplifiers $V_1$ and $V_2$ supplying an output voltage to $A_1$. Hence, only one of the signals from any of the devices $O_1$, $O_2$ and $O_3$ is invariably present at the output of $A_1$ dependent upon the output signal of III.

The output signal of the mixing device $A_1$ is supplied to an amplitude modulator AM in which this output signal is amplitude-modulated by the output signal of the device II wherein the other signal of small bandwidth is produced. The output signal of AM is supplied to a band-pass filter $F_3$ having a pass-band between the frequencies $f_d$ and $f_c$. The output signal of the filter $F_3$ is supplied to an adding device $A_2$ to which the output signal of a filter $F_2$ is also supplied. To this low-pass filter $F_2$ having a cut-off frequency $f_a$ is supplied the output signal of the device I which produces the signal of large bandwidth. The output signal of $A_2$ may be transmitted via a line or, after modulation on a high frequency carrier-wave of a frequency $f_d$ in the modulator M and bandwidth limitation in a band-pass filter $F_4$, to a transmitter antenna Z.

The receiver for the signal transmitted may be a receiver as shown in Fig. 3, except that it need not comprise a device for introducing the D.C. component into the video-frequency output signal of the detector FD.

So far it has been assumed that the auxiliary carrier-wave was transmitted with two symmetrical side-bands. Should this not be the case, for example if one of the side bands of the modulated auxiliary carrier-wave is entirely or partially suppressed, cross-talk will in general occur between the two signals modulated on the auxiliary carrier-wave. If required, the cross-talk effects resulting therefrom can be considerably diminished by transmitting one of the signals of small bandwidth with a given polarity during one frame period and with opposite polarity during a next frame period. Of course, this necessitates at the receiver end a switch-mechanism by which the signal thus transimtted is continuously supplied with the same polarity to the control electrode of the picture tube concerned.

So far it has also been assumed that either frequency modulation or phase-modulation is employed for transmission. In order to obtain given effects (pre-emphasis) it is naturally possible to transmit a part of the video-frequency band of the signal of small bandwidth concerned by means of frequency-modulation and another part by means of phase-modulation. Of course, this must be allowed for at the receiver end.

A signal emitted by transmitters of the aforesaid type can directly be received by a normal black-and-white television receiver, provided, of course, the line- and image-frequency and so on are equal for transmitter and receiver. The signal on the picture tube of this receiver will be the same as that on the picture tube $BS_1$ of the receiver shown in Fig. 3, namely the signal of large bandwidth plus disturbances of the modulated auxiliary carrier-wave. However, said disturbances will be compensated for by the said steps, which are all taken at the transmitter end, and the signal of large bandwidth contains sufficient information to yield a very satisfactory image.

The receiver set out with reference to Fig. 3 is suitable for receiving signals transmitted by a normal black-and-white television transmitter. The output signal of the detection stage DT may then be supplied, for example, to all of the three picture tubes or, in the case of a tricolour tube, to all of the three control electrodes of the tube.

What is claimed is:

1. A multiplex transmission system for transmitting in one frequency range three line-scanned image-representative signals, comprising an oscillator for producing a carrier wave, means for producing three line-scanned image-representative signals, means connected to modulate said carrier wave with one of said signals to produce a modulated carrier wave having a given frequency bandwidth, an auxiliary oscillator for producing an auxiliary carrier wave having a frequency lying within said frequency bandwidth, means connected to amplitude-modulate said auxiliary carrier wave with a second of said signals, means connected to frequency-modulate said auxiliary carrier wave with the third one of said signals, and means connected to combine said modulated carrier wave and the modulated auxiliary carrier wave.

2. A multiplex transmission system as claimed in claim 1, in which the frequency of said auxiliary carrier wave is an odd multiple of half the image repetition frequency, in which said frequency modulation means produces a frequency deviation of said auxiliary carrier wave which is proportional to variations of said third signal, and including means for removing the direct current component of said third signal.

3. A multiplex transmission system as claimed in claim 1, including means connected to reset the phase of said auxiliary oscillator to shift the phase of said auxiliary oscillation by $\pi$ radians between successive scannings of each scanned line.

4. A multiplex transmission system as claimed in claim 1, in which said frequency-modulation means produces a frequency deviation of said auxiliary carrier wave which is proportional to variations of said third signal, and including at least one additional auxiliary oscillator for producing an auxiliary carrier wave having a frequency different from that of said first-named auxiliary carrier wave, and mixing means connected to selectively render said auxiliary oscillators effective.

5. A multiplex transmission system as claimed in claim 4, in which the frequency of the auxiliary carrier wave produced by each of said auxiliary oscillators is equal to a different odd multiple of half the image repetition frequency, said auxiliary oscillators being continuously operative.

6. A multiplex transmission system as claimed in claim 4, including means connected to reset the phase of said auxiliary oscillators to shift the phase of said auxiliary oscillations by $\pi$ radians between successive scannings of each scanned line.

7. A multiplex transmission system as claimed in claim 1 in which the frequency of said auxiliary carrier-wave is an odd multiple of half the image repetition frequency, in which said frequency-modulation means produces a frequency deviation of said auxiliary carrier wave which is proportional to the variations of said third signal, and including means for removing the direct-current component of said third signal prior to modulation, and further including a reference-level signal generator connected to provide a reference-level signal indicative of the direct-current component of said third signal.

8. A multiplex transmission system as claimed in claim 1, in which said frequency-modulation means produces a frequency deviation of said auxiliary carrier wave which is proportional to the derivative in time of said third signal, and including means for removing the direct-current component of said third signal, and further including a reference-level signal generator connected to provide a reference-level signal indicative of the direct-current component of said third signal.

9. A multiplex transmission system as claimed in claim 8, including means connected to reset the phase of said auxiliary oscillator to shift the phase of said auxiliary oscillation by $\pi$ radians between successive scannings of each scanned line.

10. A multiplex transmission system as claimed in claim 8, including a receiver adapted to receive said modulated carrier waves and comprising an amplitude detector and a frequency detector each tuned to the frequency of said auxiliary carrier wave, means connected to derive the direct-current component of said third signal in response to said reference-level signal, and means connected to combine said derived direct-current component with the received component of said third signal.

11. A multiplex transmission system as claimed in claim 1, in which said frequency-modulation means produces a frequency deviation of said auxiliary carrier wave which is proportional to the variations of said third signal, and including means for removing the direct-current component of said third signal, a reference-level signal generator connected to provide a reference-level signal indicative of the direct-current component of said third signal, and a receiver adapted to receive said modulated carrier waves and comprising an amplitude detector and a frequency detector each tuned to the frequency of said auxiliary carrier wave, means connected to derive the direct-current component of said third signal in response to said reference-level signal, and means connected to combine said derived direct-current component with the received component of said third signal.

References Cited in the file of this patent

UNITED STATES PATENTS

| | | |
|---|---|---|
| 1,861,462 | Trouant | June 7, 1932 |
| 2,333,969 | Alexanderson | Nov. 9, 1943 |
| 2,598,504 | Carlson | May 27, 1952 |
| 2,635,140 | Dome | Apr. 14, 1953 |
| 2,678,348 | Ballard | May 11, 1954 |
| 2,810,780 | Loughlin | Oct. 22, 1957 |
| 2,825,753 | Hausz | Mar. 4, 1958 |